April 25, 1967  J. T. JETER, JR., ETAL  3,315,295

TORCH CLEANING TOOL

Filed July 13, 1964

United States Patent Office 3,315,295
Patented Apr. 25, 1967

3,315,295
TORCH CLEANING TOOL
James T. Jeter, Jr., Tyler, Tex. (5110 Ashbrook Road, Dallas, Tex. 75227), and Shirley McLarty, 417 Blanning St., Dallas, Tex. 75218
Filed July 13, 1964, Ser. No. 382,307
3 Claims. (Cl. 15—105)

This invention relates generally to industrial tools and more particularly to a specific maintenance device to be used with shop equipment having small jet openings or orifices.

A primary object of this invention is to provide a gas jet opening cleaning tool that is extremely beneficial when used to clean the small jet openings of a flame producing welding or cutting torch.

In the art of welding it is customary to employ a hand held torch which is supplied with a combustible gas under pressure and oxygen under pressure and to mix the gas and oxygen near a series of small jet openings so that a high velocity stream of a combustible mixture is produced. When this high velocity stream is ignited a continuous flame of extremely high temperature results. As a result of the high temperature combustion near the jet openings, a scale of carbon and/or other materials forms that, in time, will reduce or even clog the orifice diameter. Therefore it is customary for the welding torch operator to employ some type of cleaning device to keep the openings clean so the full gaseous flow may be realized. It is therefore an object of this invention to provide an improved device whereby the cleaning of such a welding torch may be accomplished conveniently and effectively.

Another object is to provide a small cylindrical device suited for carrying in coverall pockets or tool box and wherein the device is entirely self-contained and may be utilized to clean all sizes of jets openings found in welding torches.

A further object is to provide a small hand held device that includes a plurality of various sizes of cleaning needles for insertion into small jet openings for cleaning same, and wherein the various needles are instantly available for use.

And another object is to provide a cylindrical case containing various size needles that are visible externally of the case so that selection may be made without opening the case.

And yet another object is to provide an orifice cleaning device in which any of several different size cleaning needles may be selected and yet in which only one selected needle is exposed for use at any one time.

A still further object is to provide a unique structure for a torch cleaning device wherein the body is made primarily of plastic and includes easily movable longitudinal operating selector knobs for exposing the selected cleaning needle.

And another object of the invention is to provide a compact body for an orifice cleaning tool for ease of grip and handling and also provide an easy to operate cleaning needle that may instantaneously be moved to its operative position while the tool is held in its operative position. The geometrical shape of the tool body may be cylindrical, rectangular, oval or other desired configuration.

And another object of this invention is to provide a tool of the character described in which relatively long and thin cleaning needles of several diameter sizes are normally enclosed within the tool body, but which needles may be caused to project only a short distance beyond the body for initial usage. The jet openings in a welding torch that is in need of cleaning will be partially closed with scale and will require cleaning by inserting a small diameter needle first and then progressively increasing the needle diameter until the full size opening is achieved since the smaller diameter needles are more flexible they will bend under axial pressure due to columnar action if too much of their length is exposed. This tool thus provides a useful advantage by permitting only a small portion of the length of a needle to be exposed for the initial work effort.

An additional object is to provide a jet torch cleaning tool containing a plurality of different size cleaning needles and wherein positive identification of the relative size of each needle is visible from the exterior of the case.

And yet another object is to provide a tool as described that contains a movable selector disk that will permit only one needle to be projected at one time and yet may be moved to a new selected (detent) position even though other needles are not completely returned to their fully stowed positions.

These and other objects and advantages will be apparent from an examination of the following specification and drawing in which.

Figure 1:
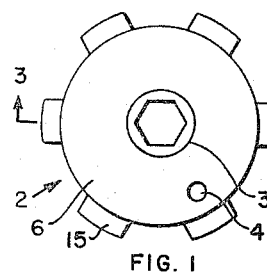
FIG. 1 represents a top plan view of the orifice cleaning tool of this invention.
Figure 2:
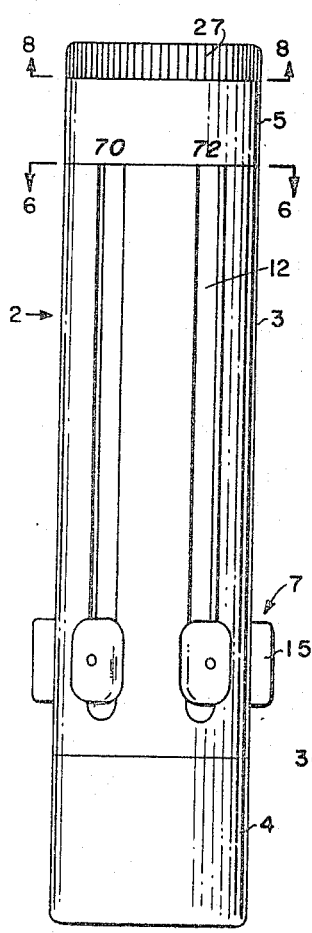
FIG. 2 is a side elevational view of the device of FIG. 1.

Referring now more particularly to the characters of reference on the drawing, it will be observed that the complete orifice cleaning tool of this invention, identified generally at 2 in FIGURES 1 and 2 consists basically of an elongated center section 3 abutting a bottom cup section 4, a top guide section 5 and a selector member or disk 6, and a plurality of orifice cleaner needle assemblies 7.

The center section 3 is a single cylindrical and tubular plastic member having reduced diameter portions 10 and 11 at top and bottom respectively and having a plurality of longitudinal slots 12 that extend from a location near the lower portion 11 to the upper portion 10. An enlarged cavity 13 is defined within the center section 3, and this cavity provides a storage section for extra cleaner needles. A small threaded bore 14 connects with the top of cavity 13 so that a continuous opening extends throughout the center section 3. The slots 12 are T-shaped in cross section so as to retain a similarly shaped knob member 15 in a manner to permit sliding but not permit entire release of the knob members 15. Square lip 15A prevents rotation of knob 15 in its slot 12.

The cup section 4 has the same outer diameter as the center section 3 to provide a smooth flush outer surface upon assembly. The inner diameter of cup section 4 cooperates with the outer diameter of bottom portion 11 to provide a snug fit to retain the cup section 4 to the center section 3 when each are engaged with the other. The cup section 4 thus closes the lower end of cavity 13 and retains any articles such as extra needles stored within the cavity.

Figure 5:
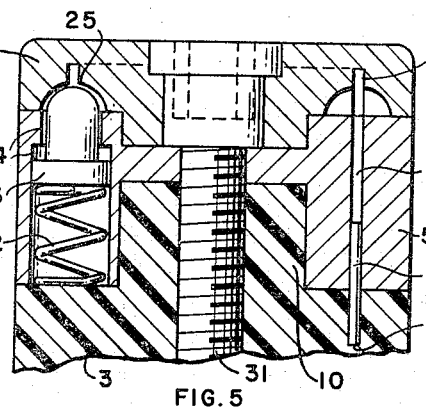
FIG. 5 is an enlarged fragmentary cross sectional view showing the detent mechanism and locking pin employed in one embodiment.
Figure 6:
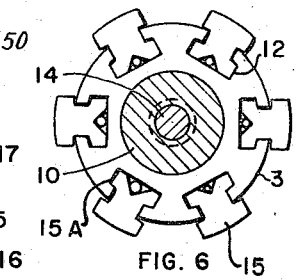
FIG. 6 is a cross sectional view taken along the lines 6—6 of FIGURE 2.

The guide section 5 has an outer diameter that corresponds to the outer diameter of the center section 3 and an inner diameter over a portion of its length that corresponds to the outer diameter of upper portion 10 so that section 5 will snugly engage portion 10 upon assembly. Referring to FIG. 5, it will be seen that a pin 16 engages corresponding slots 17 and 18 in guide 5 and center section 3 so that no relative rotation is permitted between these two members. A series of vertical holes 21 extend completely through member 5 and align with vertical slots 12 of member 3 for the purpose of permitting the needles 22 of needle structure 7 to be guided through both pieces simultaneously. Member 5 also includes a spring loaded position pin structure 23 which resides in bore 24 and is operative to seat in a detent 25 when members 5 and 6 are at a correct relative position.

Figure 8:
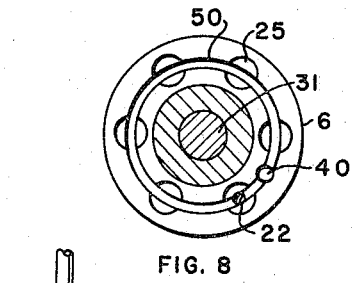
FIG. 8 is a cross sectional view of the selector disk taken along the lines 8—8 of FIG. 2.

Selector disk 6 also has an outer diameter that corresponds to the outer diameter of members 4, 3 and 5. However the outer diameter of disk 6 is serrated as at 27 to provide ease of manual moving. A shoulder bore 28 is provided in the center of disk 6 to receive a socket-head shoulder screw 31 in such a manner that screw 31 tightens into threaded bore 14 until it shoulders against the top of member 5, but does not bind in its recess 28. This construction permits disk 6 to be freely rotated relative to screw 31 and member 5 until its detent 25 is engaged by position pin 23 under action of spring 32. In FIG. 8 it will be seen that even if the needle 22 is not fully retracted, the selector knob 6 may be rotated by virtue of the continuous groove 50 that prevents the needle 22 from hanging up in one of the detents 25.

Figures 4, 9:
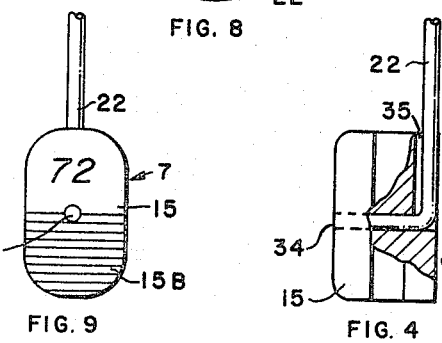
FIG. 4 is an enlarged cross sectional view of the needle control knob and attached needle.
FIG. 9 is an enlarged top plan view of the needle control knob.
Figure 3:
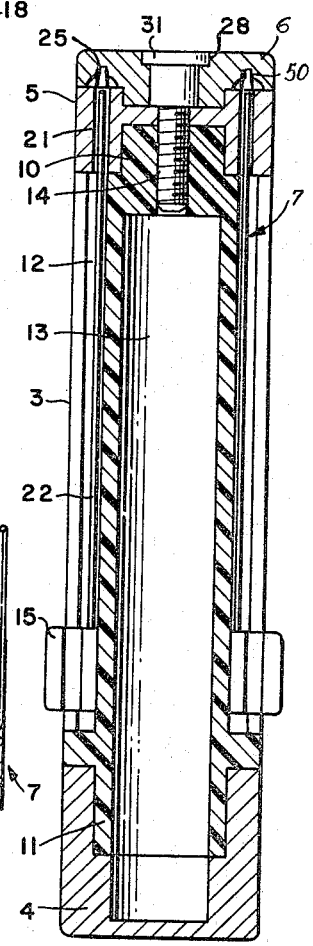
FIG. 3 is a cross sectional view taken along the lines 3—3 of FIG. 1.

The orifice cleaner needle assembly 7 is best seen with reference to FIG. 4. The knob member 15 includes a laterally extending bore 34 that passes through the knob and connects with a slot 35 that intersects the bore at one edge of the knob. The knob is "rectangular" in horizontal plan section and has a reduced rectangular section at the center. In vertical cross section the knob is made up of two T-shaped sections (or 1 H-shaped section). The lower T-shaped section rides in T-shaped slot 12 so that the knob 15 and its attached needle 22 may be freely moved lengthwise of the slot. The needle 22 is bent at a right angle where it joins knob 15 and the short end engages the lateral bore 34 and the longer end extends out from the knob 15 through slot 35. By this construction, the needle 22 is securely held in place as long as knob 15 remains in slot 12. When it is desired to replace the needle 22, the entire assembly 7 is removed from center section 3 and needle 22 removed and a new needle having a 90° bend therein is inserted into bore 34. The rectangular lower T-shaped section 15A of knob 15 riding in the T-shaped slot 12 prevents the knob from rotating in slot 12.

Figure 7:
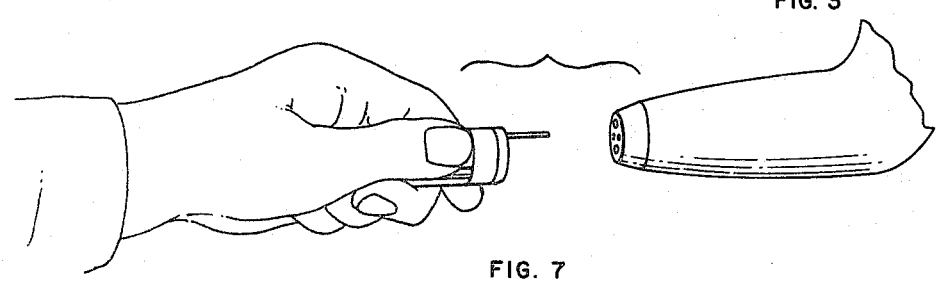
FIG. 7 is a perspective view showing the device of this invention in operation.

The completed assembly provides identifying numbers on the guide section 5 over the correct slot 12 and shown as "70" and "72" on member 5 of FIG. 2 to identify the drill size number (70, 72, etc.) that corresponds to the diameter of the needle 22 in the particular slot or guide means 12. Alternatively, the number identification may be placed on the external surface of the knob as shown in FIG. 9, or the identification may be given in the form of a color code, as shown at 15B in FIG. 9, for easy recognition. The selector disk 6 includes a single hole that may be used as a marker to align with the proper slot and with the identifying number when one particular needle 22 is selected. With the described pin-detent system, alignment is relatively simple. When the hole 40 is moved to the approximate position the operator will be able to feel the correct position by the seating of pin 23 in detent 25. At this point, the single hole 40 in disk 6 aligns with hole 21 in section 5 and with slot 12 in section 3, so that by applying sliding pressure to knob 15, the needle 22 will pass upward through slot 12, guide hole 21 and selector disk hole 40 and project beyond the main body of the device 2. The operator may control the extent to which the needle 22 projects beyond the body when thus extending the needle for cleaning purposes as depicted in FIG. 7.

From the foregoing description it will be readily seen that there has been produced a device which substantially fulfills the objects of the invention as set forth herein. The invention is not limited to the exemplary construction herein shown and described, but may be made in many ways within the spirit of the appended claims.

What is claimed is:

1. A tool assembly comprising a body, a plurality of slots in said body, a top section on said body defining guide openings in alignment with said slots, needle structures in said slots, and means to permit movement of said needle structures in said slots and through said guide openings until one end of a selected one of said needle structures projects beyond said body and is available for utility purposes, a selector member on said tool assembly to permit only selected needle structure to project beyond said body, said needle structures including different size needles in certain slots, and means on said tool assembly to identify the size of each needle, each of said needle structures including a knob in sliding relation with said slot.

2. A tool assembly comprising a body, a plurality of slots in said body, a top section on said body defining guide openings in alignment with said slots, needle structures in said slots, and means to permit movement of said needle structures in said slots and through said guide openings until one end of a selected one of said needle structures projects beyond said body and is available for utility purposes, a selector member on said tool assembly having a single hole therethrough to permit only selected needle structure to project beyond said body, said needle structures including different size needles in certain slots, and means on said tool assembly to identify the size of each needle, each of said needle structures including a knob in sliding relation with said slot, the hole of said selector member adapted to be moved to a position of alignment with each slot and means to hold said member at said position.

3. A maintenance tool assembly comprising a body, a plurality of slots in said body, a top section on said body defining openings in alignment with said slots, various size needles in said slots, a knob attached to one end of each needle and riding in each of said slots, a selector member on said body having a single hole therethrough, means to permit said selector member to be moved until said single hole aligns with one of said openings in said top section and with the slot containing a selected needle, and means to hold said member at the position of said alignment.

References Cited by the Examiner

UNITED STATES PATENTS

| | | | |
|---|---|---|---|
| 24,502 | 6/1859 | Sturdy | 7—15 |
| 463,507 | 11/1891 | Goodell | 145—62 |
| 607,708 | 7/1898 | Seidel | 120—14.3 |
| 2,337,514 | 12/1943 | Wilcox | 145—62 |
| 2,519,559 | 8/1950 | Foster et al. | |
| 2,629,413 | 2/1953 | Stettler | 7—15 X |
| 2,690,738 | 10/1954 | Andonov | 120—14.5 X |
| 3,216,288 | 11/1965 | Gardner | 145—64 X |

FOREIGN PATENTS 622,540   5/1949   Great Britain.

DANIEL BLUM, *Primary Examiner*.